United States Patent [19]

Chapman

[11] Patent Number: 5,343,957
[45] Date of Patent: Sep. 6, 1994

[54] HORSESHOE MADE OF RESILIENT MATERIAL, HORSESHOEING SYSTEM AND METHOD

[76] Inventor: Larry L. Chapman, 999 E. 160th Ave., Broomfield, Colo. 80020

[21] Appl. No.: 93,551

[22] Filed: Jul. 19, 1993

[51] Int. Cl.⁵ .............................................. A01L 1/04
[52] U.S. Cl. ......................................... 168/11; 168/23
[58] Field of Search ................ 168/11, 13, 23, DIG. 1

[56] References Cited

U.S. PATENT DOCUMENTS

| 308,085 | 11/1984 | Marshall | 168/11 |
|---|---|---|---|
| 737,845 | 9/1903 | Jackson | 168/13 |
| 971,138 | 9/1910 | McCormick | 168/11 X |
| 1,468,196 | 9/1923 | Curzon | 168/11 |
| 1,953,281 | 4/1934 | Veran | 168/13 |
| 2,064,531 | 12/1936 | Genecand | 168/34 |
| 3,469,631 | 9/1969 | Becker | 168/4 |
| 4,881,600 | 11/1989 | Nebel | 168/11 |
| 5,048,614 | 9/1991 | Klimko | 168/29 |
| 5,168,934 | 12/1992 | Nebel et al. | 168/11 |
| 5,230,384 | 7/1993 | Nebel et al. | 168/11 |

OTHER PUBLICATIONS

The Channel Rubber Horseshoe; 3/MI. Mfg. Inc. (date unknown).
New Product; 3/MI. Mfg. Inc.; p. 108; The Draft Horse Journal, Summer 1991.
California Quick Shoe, a new concept in horse shoes; Crystal Hill Ranch (date unknown).
Nova Racer; Target International Marketing Inc. (date unknown).
Sneakers for Horses; Equithotics, Inc. (date unknown).
Slypner Sport Horseshoes; p. 31, Driving Digest Magazine #73, 1992/5.

Primary Examiner—Robert P. Swiatek
Attorney, Agent, or Firm—Harold A. Burdick

[57] ABSTRACT

An improved horseshoe made of resilient material, and a horeshoeing system and method, with the system including resilient material and underlying metal shoe portions. The resilient material shoe portion has a plurality of openings therethrough between a ground engaging face and an opposite face for passage therethrough of connecting bolts utilized to connect the shoe portions. The openings are positioned so that there is no interference between connecting bolts and nails arranged in a common nailing pattern used to attach the metal shoe portion to the horse's hoof, while still providing durable securement of the portions of the system. The horseshoeing method provides for selective positioning of the portions relative to one another and for connection of the resilient material portion to a metal shoe portion having an overall configuration selected to accommodate the particular characteristics of the horse being shod.

16 Claims, 3 Drawing Sheets

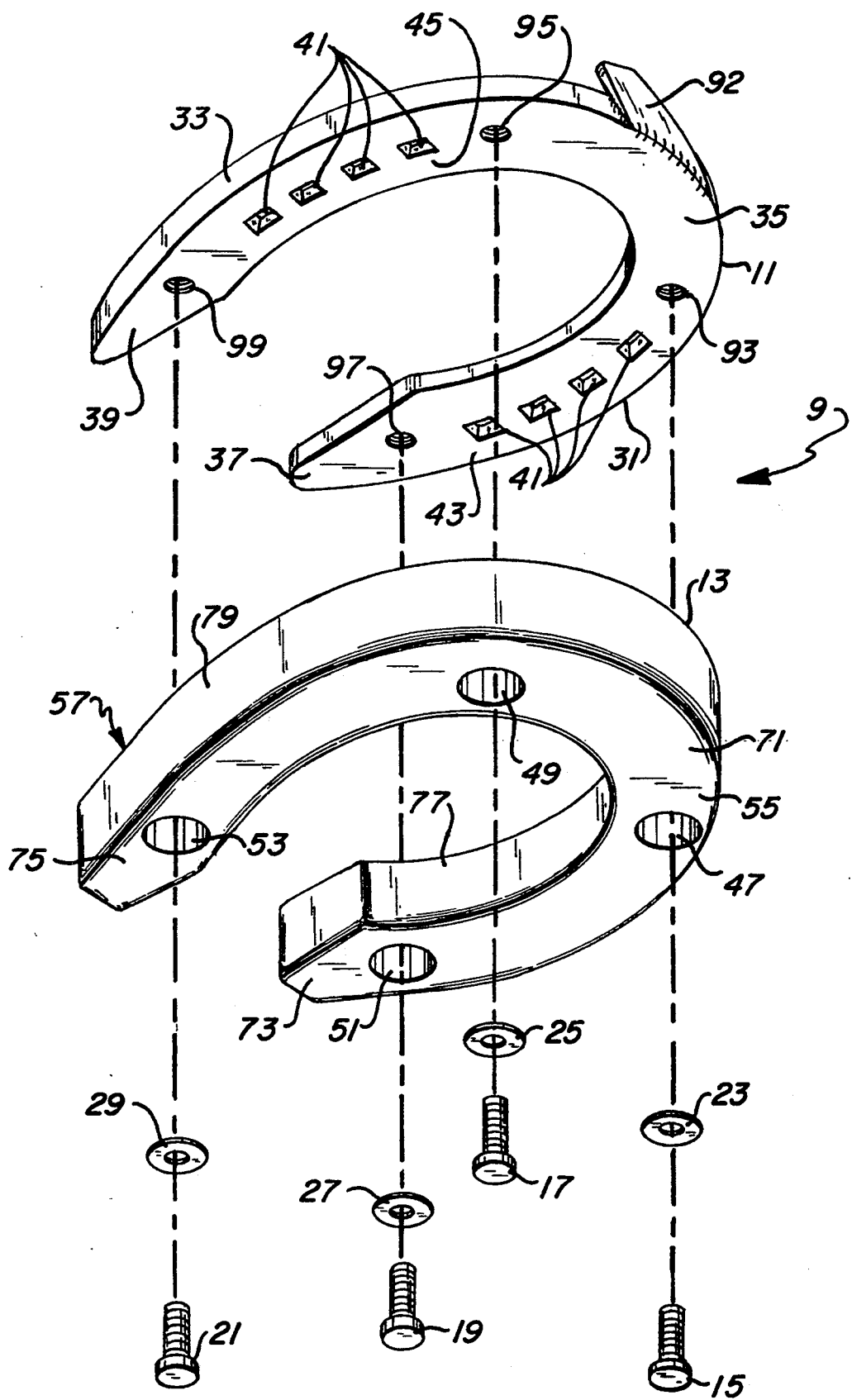
Fig_1

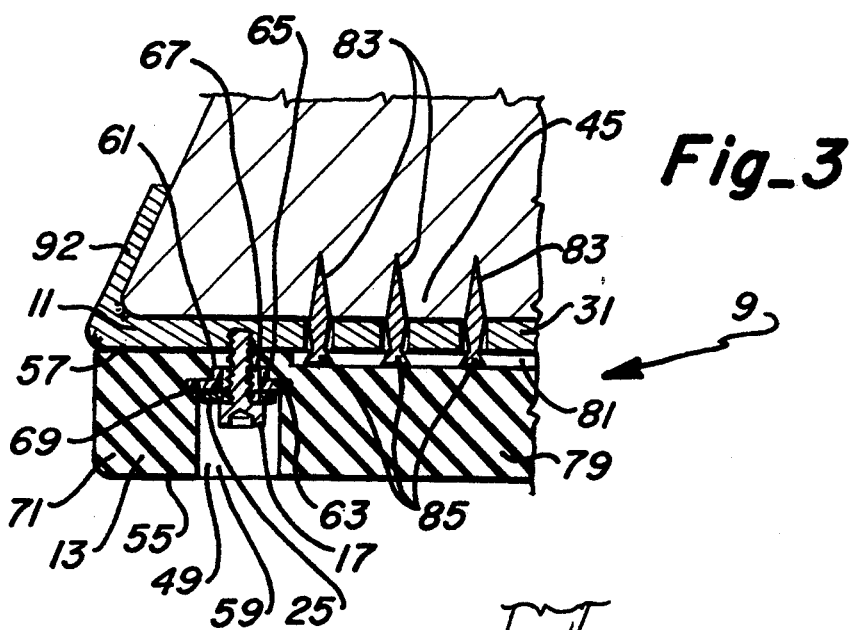
Fig_3
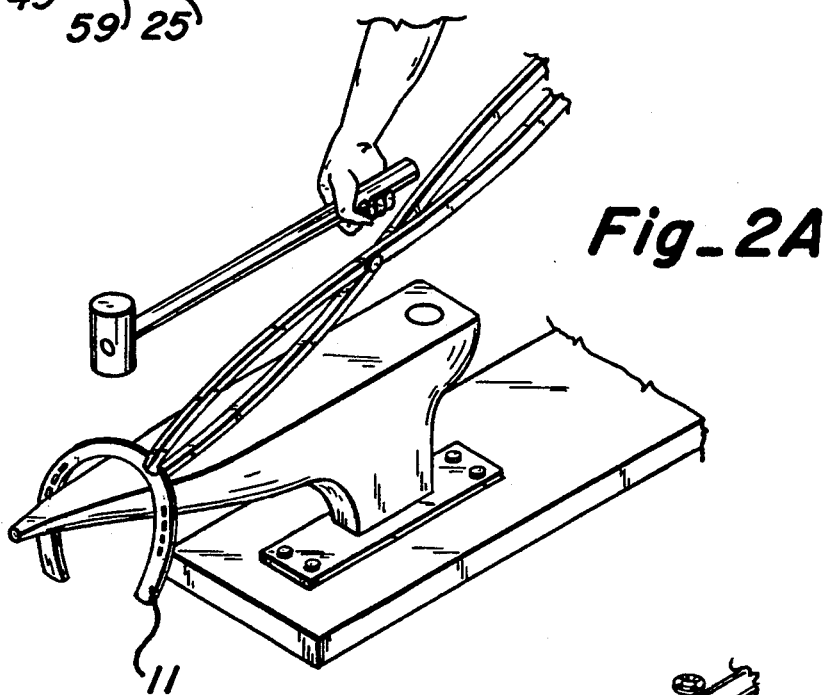
Fig_2A
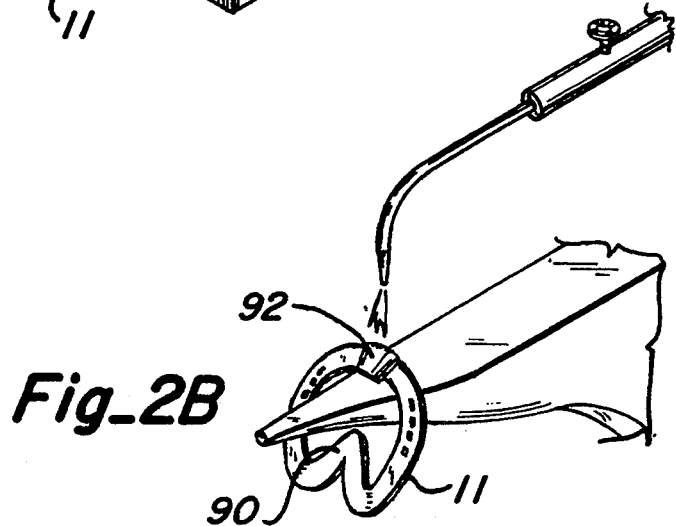
Fig_2B

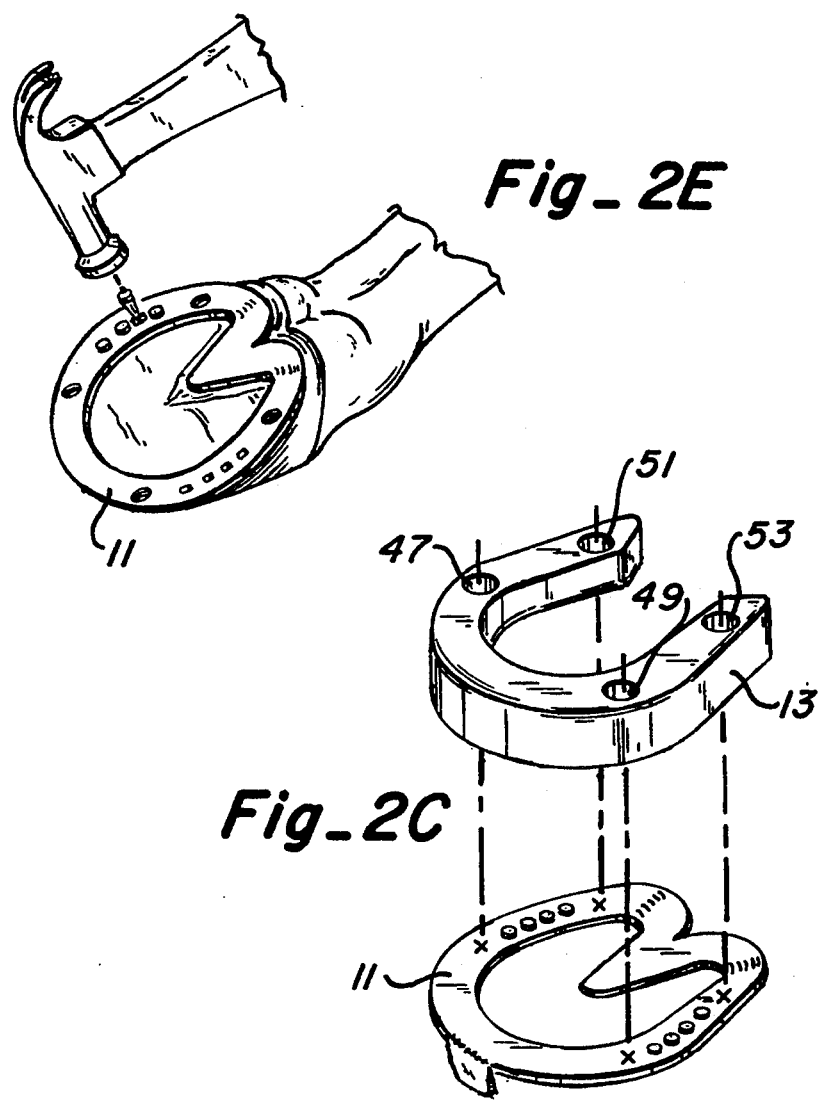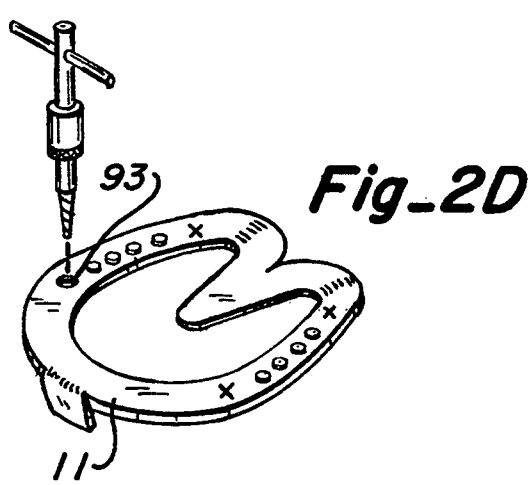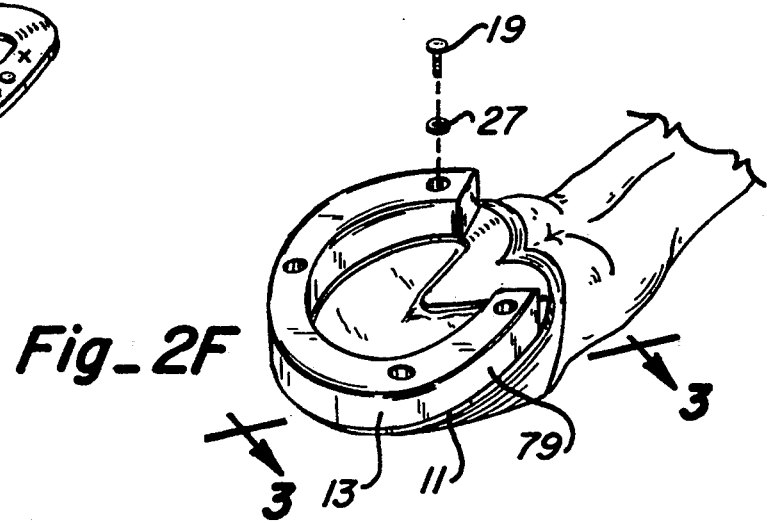

ered utilizing techniques well known to farriers, wherein the resilient material shoe may be applied to a variety of metal shoes and is durable when applied, wherein proper fit on the horse and corrective and/or therapeutic shoeing is not inhibited, and wherein the shoe is readily replaceable without impact to the horse.

HORSESHOE MADE OF RESILIENT MATERIAL, HORSESHOEING SYSTEM AND METHOD

FIELD OF THE INVENTION

This invention relates to shoes for horses, and, more particularly, relates to horseshoes adapted for improved traction and/or shock absorption and methods of applying such horseshoes.

BACKGROUND OF THE INVENTION

Horses that are required to be active on paved, paneled, or otherwise compacted or hard surfaces (for example, police, carriage, parade, circus and stage performing horses, or horses typically ridden and/or otherwise utilized in urban environments and on streets and roads) frequently have been shod utilizing rubber or other resilient material at the ground engaging face of the shoe in order to improve traction and absorb shock.

Such shoes have included simple rubber pads nailed to the hoof, rubber coated metal horseshoes (again simply nailed to the hoof), and more elaborate systems for attaching a resilient material to a metallic horseshoe structure (see U.S. Pat. Nos. 4,881,600, 5,048,614 and 5,168,934).

Such systems have often required significant alteration of the structure of the underlying metal shoe, and/or use of a single sourced manufactured metal shoe for use in the chosen system, and/or use of an underlying shoe of less than optimal dimensions (e.g., thickness, width and weight) for the particular horse being shod. Frequently, unduly close fitting due to alteration of well known horseshoe nailing patterns required by the position of the various attachment mechanisms utilized to attach the resilient material shoe to the metal shoe and/or more frequent shoe replacement (since the resilient materials wear more rapidly than a metal shoe), thereby increasing the potential for hoof damage, are necessitated. Lack of durability of the resilient material shoe has also been of concern when utilizing some such systems, tearing and uneven wear due to attachment techniques having been known to occur.

Moreover, such shoes and shoeing systems have limited the farrier's ability to compensate for impediments of stance, gait and/or health of a horse being shod by various corrective and therapeutic shoeing techniques known to those skilled in the farrier's art. This may be due to inflexible design of the underlying metal shoe wherein addition or alteration of various shoe structure (such as addition of heart bars, toe clips or the like, or specialized shaping, for example extended toe, rocker, or weighted shoes and the like) is difficult or impossible. This may also be due to inflexibility in overall system design wherein the farrier has no control over the relative positions of the resilient material portion and underlying metallic shoe portion of the system when applying the system to a horse being shod.

It would thus be desirable to provide such a resilient material horseshoe and shoeing system wherein the underlying metal shoe may be applied using well known nail placement techniques and nailing patterns, wherein the resilient material shoe portion may be applied to a metal shoe fashioned by the farrier or provided by any of the numerous shoe manufacturers (i.e., keg shoes) and is durable when applied, wherein flexibility remains to allow the farrier to achieve proper fit on the horse and to practice various necessary and desirable corrective and/or therapeutic shoeing techniques including structural additions and/or shaping of the underlying metal shoe as well as selectivity of relative positioning of the resilient material and metal shoe portions, and wherein replacement of the resilient material shoe portion may be accomplished without removal of the underlying metal shoe.

SUMMARY OF THE INVENTION

This invention provides an improved horseshoe made of resilient material, horsehoeing system and method wherein the underlying metal shoe may be fit and applied using techniques well known to farriers, wherein the resilient material shoe may be applied to a variety of metal shoes and is durable when applied, wherein proper fit on the horse and corrective and/or therapeutic shoeing is not inhibited, and wherein the shoe is readily replaceable without impact to the horse.

The method for shoeing a horse of this invention includes providing a first shoe portion of resilient material having a plurality of openings therethrough and a second shoe portion made of rigid material and having apertures positioned therethrough to accommodate nailing thereof to a horse's hoof, the positions of the apertures being those substantially normally utilized by horseshoers for such nailing. The shoe portions are manipulated so that a selected proper relative positioning of the portions is achieved and the position of the openings of the first shoe portion are then marked on the second shoe portion, the openings through the first shoe portion having been initially formed to avoid overlap of the openings with the apertures in the second shoe portion.

Connector receiving structures are then formed in the second shoe portion where marked and it is nailed to the hoof. Thereafter, connectors are used through the openings of the first shoe portion and received in the connector receiving structures of the second shoe portion to attach the shoe portions, the first shoe portion thereby being readily replaceable without removal of the second shoe portion.

The improved horseshoe of this invention is utilized in a system with a rigid shoe structure including inside and outside branches, the rigid shoe structure being applied to a horse's hoof utilizing nails in a horseshoe nailing pattern commonly utilized by horseshoers having a first row of nails in the inside branch and a second row of nails in the outside branch. The improved horseshoe includes a shoe body made of resilient nonmetallic material having a plurality of openings extending therethrough, the openings configured to accept connecting means for attaching the shoe body to the shoe structure on the horse's hoof and being spaced from one another so that at least the first row of nails is located between adjacent ones of the openings.

It is therefore an object of this invention to provide an improved horseshoe made of resilient material and horseshoeing system and method utilizing such a horseshoe.

It is another object of this invention to provide a horseshoeing system and method utilizing a horseshoe made of resilient material wherein an underlying metal shoe may be applied using well known nail placement techniques and nailing patterns.

It is still another object of this invention to provide a horseshoeing system and method utilizing a horseshoe made of resilient material wherein the resilient material shoe portion may be applied to a metal shoe fashioned by the farrier or provided by any of numerous shoe manufacturers and is durable when applied.

It is yet another object of this invention to provide a horseshoeing system and method utilizing a horseshoe made of resilient material wherein flexibility remains to allow the farrier to achieve proper fit on the horse and to practice various necessary and desirable corrective and/or therapeutic shoeing techniques including structural additions and/or shaping of the underlying metal shoe as well as selectivity of relative positioning of resilient material and metal shoe portions of the system.

It is yet another object of this invention to provide a horseshoeing system and method utilizing a horseshoe made of resilient material wherein replacement of the resilient material shoe portion may be accomplished without removal of the underlying metal shoe.

It is still another object of this invention to provide a method for shoeing a horse including the steps of providing a first shoe portion of resilient material having a plurality of openings therethrough and a second shoe portion made of rigid material and having apertures positioned therethrough to accommodate nailing thereof to a horse's hoof, the positions of the apertures being those substantially normally utilized by horseshoers for such nailing, positioning and manipulating the shoe portions so that a selected proper relative positioning of the shoe portions is achieved, marking the position of the openings of the first shoe portion on the second shoe portion, the openings through the first shoe portion having been initially formed to avoid overlap of the openings with the apertures in the second shoe portion, forming connector receiving structures in the second shoe portion where marked, nailing the second shoe portion to the horse's hoof, and utilizing connectors through the openings of the first shoe portion and received in the connector receiving structures of the second shoe portion to attach the shoe portions.

It is yet another object of this invention to provide an improved horseshoe including a shoe body made of resilient nonmetallic material having a plurality of openings extending therethrough, the openings configured to accept connecting means for attaching the shoe body to a rigid shoe structure on the horse's hoof and being spaced from one another so that at least a first row of nails utilized to attach the rigid shoe structure to the hoof is located between adjacent ones of the openings.

It is still another object of this invention to provide a horseshoeing system including a rigid shoe portion having inside and outside branches with each branch having a plurality of apertures for receiving horseshoe nails therethrough, a resilient material shoe portion having a plurality of openings therethrough, and attachment means receivable at the openings of the resilient material shoe portion and engageable with the rigid shoe portion for connecting the shoe portions, the openings being positioned through the resilient material shoe portion so that the apertures in the outside branch of the rigid shoe portion are positioned between adjacent ones of the openings when the shoe portions are connected, and so that the apertures in the inside branch of the rigid shoe portion are positioned between adjacent ones of the openings when the shoe portions are connected.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is an exploded view showing the horseshoe and shoeing system of this invention;

FIGS. 2A through 2F are illustrations showing the shoeing method of this invention utilizing the shoeing system of this invention; and FIG. 3 is a sectional view of the shoeing system of this invention taken through section line 3—3 of FIG. 2F.

DESCRIPTION OF THE INVENTION

Referring now to the FIGURES, horseshoeing system 9 is illustrated in FIG. 1. System 9 includes metal shoe portion 11, resilient material shoe portion 13, connecting bolts 15, 17, 19 and 21 and washers 23, 25, 27 and 29.

Metal shoe portion 11 is a unitarily formed metal (typically mild steel material) shoe having inside branch 31 and outside branch 33. The branches extend from toe portion 35 to heel portions 37 and 39, respectively. As illustrated in FIG. 1, wherein a shoe of common shape (i.e. having no corrective or therapeutic attachments or shaping performed thereon) is provided, a plurality of nailing apertures 41 are formed (punched, either at a factory in the case of keg shoes or by the farrier) in each branch forming a nail pattern commonly utilized by farriers for nailing metal shoe portion 11 to the horse's hoof. This nailing pattern consists of first row 43 through inside branch 31 and second row 45 through outside branch 33.

Resilient material shoe portion 13 includes a plurality of openings (preferably four openings) 47, 49, 51 and 53 extending between ground engaging face 55 and opposite face 57 (as also shown in FIG. 3 with respect to opening 49, it being understood that each of the openings is substantially identical). As illustrated in FIG. 3 with respect to opening 49, each opening includes enlarged bore 59 at ground engaging face 55 and smaller bore 61 extending between enlarged bore 59 and opposite face 57.

Bushing 63, made of a more rigid plastic material than the resilient material portion 13 (preferably a polycarbonate, FCR grade with a 10 to 12 melt flow rating), is embedded in resilient material portion 13 adjacent to each one of the openings 47, 49, 51 and 53 at the time of formation of portion 13 as set out hereinbelow. Bushing 63 includes a tubular portion 65 having opening 67 therethrough corresponding in cross section to bore 61, and has annular shoulder 69 at one end thereof.

Bushing 63 serves several purposes. Since it is made from a much harder material than resilient material shoe portion 13, a positive stop for bolts 15, 17, 19 and 21 and washers 23, 25, 27 and 29 is created to insure the bolts can not be screwed into the horse's foot and/or cause damage to portion 13 at the openings. Bushing 63 provides a larger and more rigid surface area at shoulder 69 for pinching portion 13 thereat between portion 11 thus providing better and more durable securement. Finally, it also allows the farrier to enlarge openings 47, 49, 51 and 53 if necessary, using a hand drill and bit in the field.

If tapped threaded openings 93, 95, 97 and 99 in metal shoe portion (as discussed hereinafter) are inadvertently out of line with openings 47, 49, 51 and 53 at the time the farrier wishes to attach portion 13 to portion 11, the opening may be enlarged by enlarging opening 67 of bushing 63, without danger of weakening the openings through the resilient material, to accommodate precision fitting and without requirement for special tools.

As also shown in FIGS. 1 and 3, resilient material shoe portion 13 has an overall shape substantially corresponding to the shape of shoe portion 11 (though modifications of relative size and shape could be provided as might be dictated by corrective and/or therapeutic needs of a particular horse) including toe portion 71 and heel portions 73 and 75 at the end of branches 77 and 79, respectively. Indentations 81 are formed in face 57 of branches 77 and 79 (shown in FIG. 3 with respect to outside branch 79, it being understood that a similar indentation is provided in inside branch 77) at a position and configured to overlie rows 43 and 45 of nails 83. Indentations 81 have a depth approximating the thickness of heads 85 of nails 83, a width approximating the width of heads 85 of nails 83, and a length greater than the length of a row 43 or 45 of nails 83, and are provided to give a good seat between portions 11 and 13 and to prevent any potential tearing of portion 13 on heads 85 or discomfort to the horse.

The four bolt pattern illustrated in FIG. 1 is most advantageous because it allows for durable securement without placing fasteners in critical area of metal shoe portion 11, while minimizing the number of openings in resilient material shoe portion 13 thereby reducing the likelihood of a weakened structure and undue material wear. Bolts closer to toe 71 or in the center of toe 71 would increase wear and weaken the overall resilient material shoe structure, while moving bolts 15 and 17 back further toward held 73 and 75 would interfere with normal nail hole placement on standard width steel shoes. Heel bolts 19 and 21 are positioned forward enough (toward toe 71) to allow a farrier to cut off heel lengths when necessary for proper fit without compromising the securing system (i.e., so that a row 43 or 45 of apertures 41, and thus nails 83 in such row, will always be positioned between immediately adjacent openings 47/51 or 49/53, respectively, along each branch).

Resilient material portion 13 is made of material that allows for some slippage as the horse moves his foot forward, shock absorption (as compared to steel) as the foot impacts surfaces and traction (improved as compared with steel) as the horse pushes off or walks. Preferably, this material is polyurethane material, for example a polyester/TDI polymer with a diamine curative, with a durometer of between about 80 and 100 Shore A (preferably about 50 to 51 Shore D). Portion 13 could be made of any other suitable material, such as vulcanized rubber, provided it is rigid enough so that no additional fasteners are required to assure durable securement, yet flexible enough to spread or contract to match a steel shoe a farrier shapes for an individual horse's foot.

Portion 13 is made in industry standard sizes to match standard steel shoe sizes, and may be manufactured with varying hardnesses, widths and thicknesses in each shoe size to accomplish selected characteristics of wear and longevity, shock absorption and durability for a variety of conditions of concussion, shear force, twisting, temperature and moisture extremes, and the like.

By way of example, for industry standard sizes 7 through 0, the following relative dimensions (material thickness and width, in inches) of materials could be utilized in the system of this invention could be utilized:

| Size | Metal Material Dimensions | Resilient Material Dimensions |
| --- | --- | --- |
| 7, 6, 5 | 5/16 × 1½ | 1⅜ × 1¼ |
| 4 | 5/16 × 1¼ | 1¼ × 1¼ |
| 3 | ¼ × 1 | 1⅛ × 1 |
| 2, 1, 0 | ¼ × 1 | 1⅛ × ¾ |

Resilient material portion 13 may be formed utilizing known manufacturing techniques such as bench molding, cavity molding, injection molding or milling, the technique selected being capable of producing portion 13 which will hold its overall shape while allowing some flexibility for installation thereof. In the case of bench molding for example, a mold (for example, made of polyurethane or aluminum) is provided having plates positioned to correspond to indentations 81 and pins positioned to correspond to openings 47, 49, 51 and 53 and upon which are set bushings 63. A selected material is poured into the mold, the material is cured as is appropriate to the selected material, and the finished product is released from the mold, trimmed and cleaned.

The method for shoeing a horse of this invention will be described with reference to FIGS. 2A through 2F. After the horse's hoof has been trimmed and shaped, metal shoe portion 11 is provided, either purchased in an appropriate size, in which case apertures 41 will have already been punched, or formed to fit by the farrier, who will punch apertures 41. Most of the apertures 41 are typically placed in the front half of shoe portion 11 (toward the tow) so that they won't interfere with the movements of the foot. Heel apertures 41 (those nearest heel portions 37 and 39 in each row 43 and 45) are typically positioned at or slightly forward of the bend in the quarters. Apertures 41 are usually positioned in from the outside of the shoe the thickness of the shaped wall at that point.

Corrective or therapeutic structures, such as heart bar 90 or toe clip 92, are then welded to shoe portion 11 as may be necessary for a given horse (metal shoes utilized with systems such as that illustrated herein typically are provided with toe clips to prevent horseshoe nail breakage). Specialized shaping of metal shoe portion 11 of a corrective or therapeutic nature may also be performed, such structures and shaping and their utility being well known to skilled farriers.

Resilient material shoe portion 13 is then positioned adjacent to metal shoe portion 11 and the locations of openings 47, 49, 51 and 53 of the properly positioned portion 13 are marked on shoe portion 11 (FIG. 2C), the relative position of the portions being selected by the farrier in view of any fault or faults of gate or stance which the particular horse being shod may exhibit. Since shoe portion 13 remains flexible (i.e., the branches may be spread, narrowed or skewed), manipulation thereof is possible during such positioning to accommodate the particularized shape of shoe portion 11 after it has been fit and/or adjusted for corrective and/or therapeutic reasons.

For example, shoe portion 13 may be positioned relative to shoe portion 11 to effectively increase the angle of the combined toe 35/71 on front feet and/or decrease the angle of the combined toe 35/71 on the hind feet of a horse that exhibits forging (interference between the bottom of the front shoe and the toe of the hind shoe on the same side) by moving the front edge of toe 71 forward or rearward of the front edge of toe 35. Similar such adjustment, both forward and rearward as well as side to side, may be utilized to correct other faults of gait and/or stance without openings 47, 49, 51 and 53 interfering with the apertures 41 or aperture rows 43 and 45.

Threaded openings 93, 95, 97 and 99 are then formed (utilizing a tapping tool) in metal shoe portion 11 by the farrier (FIG. 2D), and shoe portion 11 is nailed to the horse's hoof (FIG. 2E). Shoe portion 13 is then bolted to shoe portion 11 (FIG. 2F). In case of inadvertent misalignment during marking, adjustment of fit can be achieved by enlarging openings 67 of bushings 63 as heretofore described.

As may be appreciated, an improved horseshoeing system and method utilizing a horseshoe made of resilient material is provided by this invention which enhances the ability of farriers to practice their art, which is durable and secure, and which can be used without alteration of commonly utilized metal shoe layout, construction and nailing patterns.

What is claimed is:

1. A method for shoeing a horse comprising:
providing a first shoe portion of resilient material having a plurality of openings formed therethrough between a face intended to be ground engageable and an opposite face thereof;
providing a second shoe portion made of rigid material and having apertures positioned therethrough to accommodate nailing of said second shoe portion to a hoof of a horse being shod, the positions of said apertures being those substantially normally utilized by horseshoers for nailing of a horseshoe to a horses hoof;
positioning said first shoe portion adjacent to said second shoe portion and manipulating said first shoe portion to achieve proper relative positioning of said portions;
marking the position of said openings of said first shoe portion on said second shoe portion when properly relatively positioned, said openings having been formed in said first shoe portion so that overlap of said openings with said apertures in said second shoe portion is avoided;
forming connector receiving structures in said second shoe portion where marked;
nailing said second shoe portion to said hoof; and
utilizing connectors through said openings through said first shoe portion and received in said connector receiving structures of said second shoe portion to attach said first shoe portion to said second shoe portion.

2. The method of claim 1 further comprising shaping said second shoe portion to fit a particular hoof of a horse being shod before positioning said first shoe portion and marking the position of said openings.

3. The method of claim 2 further comprising connecting one of a corrective or therapeutic structure to said second shoe portion.

4. The method of claim 1 wherein the step of positioning and manipulating said first shoe portion includes the step of positioning and manipulating said first shoe portion relative to said second shoe portion to achieve a selected proper relative positioning of said shoe portions selected to accommodate a correction of one of a fault and faults of gait of said horse being shod.

5. The method of claim 1 wherein the step of providing said first shoe portion includes the step of providing said first shoe portion having a selected one of any of a plurality of sizes and shapes.

6. The method of claim 1 wherein the step of providing said first shoe portion includes the step of forming said first shoe portion with a relatively rigid nonmetallic bushing embedded in said resilient material adjacent to each one of said plurality of openings.

7. The method of claim 1 wherein said first shoe portion has four of said openings, wherein said second shoe portion includes inside and outside branches, and wherein the step of nailing said second shoe portion to said hoof includes utilizing a nailing pattern commonly utilized by horseshoers having a first row of nails in said inside branch and a second row of nails in said outside branch of said second shoe portion, said openings being formed in said first shoe portion so that none of said openings overlaps with said rows of nails in said common nailing pattern.

8. An improved horseshoe utilized with a rigid shoe structure including inside and outside branches, the rigid shoe structure being applied to a horse's hoof utilizing nails in a horseshoe nailing pattern commonly utilized by horseshoers having a first row of nails in the inside branch and a second row of nails in the outside branch, said improved horseshoe comprising:
a shoe body made of resilient nonmetallic material and having a plurality of openings extending therethrough between a face intended to be ground engageable and an opposite face, said openings each including an enlarged bore at said face and a smaller bore at said opposite face, said bores each having a depth and meeting at a position in said shoe body, said openings being spaced from one another so that at least the first row of nails is located between adjacent ones of said openings;
bushings made of relatively rigid, nonmetallic material and each including a tubular portion and an annular shoulder at one end of said tubular portion, said bushings each at least partially embedded in said resilient nonmetallic material of said shoe body with different ones of said tubular portions of said bushings lining a portion of different ones of said smaller bores of said openings and with said annular shoulders at least partially embedded in said resilient nonmetallic material adjacent to different ones of said positions in said shoe body; and
connectors having heads of a size so that each said head of each said connector is completely receivable in different ones of said enlarged bores of said openings a distance below said face of said shoe body, said annular shoulders of said bushings providing a positive stop for said heads of said connectors when applying said shoe body to the rigid shoe structure, said shoe body adjacent to said smaller bores of said openings being pinched between said annular shoulders and the rigid shoe structure when said connectors are applied.

9. The horseshoe of claim 8 wherein said resilient nonmetallic material is one of polyurethane and vulcanized rubber.

10. The horseshoe of claim 8 wherein said openings through said shoe body are positioned so that said shoe body is selectively positionable relative to the rigid shoe structure without overlap of said openings with the rows of nails, said relative selected positioning of said shoe body and the shoe structure selected to accommodate a correction of one of a fault and faults of gait of the horse being shod.

11. The horseshoe of claim 8 wherein said shoe body includes indentations at said opposite face thereof positioned to overlie the rows of nails when said shoe body is connected to the rigid shoe structure.

12. The horseshoe of claim 8 wherein said shoe body includes a toe portion and first and second heel portions, first and second ones of said openings being positioned adjacent to said toe portion of said shoe body, and third and fourth ones of said openings being positioned adjacent to said first and second heel portions, respectively, of said shoe body.

13. A horseshoeing system comprising:
  a rigid shoe portion having inside and outside branches with each branch having a plurality of apertures for receiving horseshoe nails therethrough;
  a resilient material shoe portion having a plurality of openings therethrough each of said openings including an enlarged bore at a face of said resilient material shoe portion and a smaller bore at an opposite face thereof, said bores each having a depth and meeting at a position in said resilient material shoe portion;
  bushings made of relatively rigid, nonmetallic material and each including a tubular portion and an annular shoulder at one end of said tubular portion, said bushings each at least partially embedded in said resilient material shoe portion with different ones of said tubular portions of said bushings lining a portion of different ones of said smaller bores of said openings and with said annular shoulders at least partially embedded in said resilient material adjacent to different ones of said positions in said resilient material shoe portion;
  connectors having heads of a size so that each said head of each said connector is completely receivable in different ones of said enlarged bores of said openings a distance below said face of said resilient material shoe portion, said annular shoulders of said bushings providing a positive stop for said heads of said connectors when applying said resilient material shoe portion to said rigid shoe portion, said resilient material shoe portion adjacent to said smaller bores of said openings being pinched between said annular shoulders and said rigid shoe portion when said connectors are applied; and
  said openings being positioned through said resilient material shoe portion so that said apertures in said outside branch of said rigid shoe portion are positioned between adjacent ones of said openings when said shoe portions are connected, and so that said apertures in said inside branch of said rigid shoe portion are positioned between adjacent ones of said openings when said shoe portions are connected.

14. The system of claim 13 wherein said resilient material shoe portion includes indentations positioned to overlie the apertures in said branches of said rigid shoe portion when said shoe portions are connected.

15. The system of claim 13 wherein said shoe portions have complementary configurations and sizes, said configurations including either of front and hind configurations.

16. The system of claim 13 wherein said resilient material shoe portion includes a toe portion and first and second heel portions, first and second ones of said openings being positioned adjacent to said toe portion of said resilient material shoe portion, and third and fourth ones of said openings being positioned adjacent to said first and second heel portions, respectively, of said resilient material shoe portion.

* * * * *